United States Patent
Benayoun et al.

(10) Patent No.: US 7,203,834 B1
(45) Date of Patent: Apr. 10, 2007

(54) METHOD OF UPDATING ENCRYPTION KEYS IN A DATA COMMUNICATION SYSTEM

(75) Inventors: Alain Benayoun, Cagnes-sur-Mer (FR); Jean-Francois LePennec, Nice (FR); Patrick Michel, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 282 days.

(21) Appl. No.: 09/573,527

(22) Filed: May 17, 2000

(30) Foreign Application Priority Data

Nov. 25, 1999 (EP) .................................. 99480123

(51) Int. Cl.
*H04L 9/28* (2006.01)
*H04L 9/00* (2006.01)

(52) U.S. Cl. ...................................... 713/168; 380/277
(58) Field of Classification Search ................ 713/193, 713/200, 201, 158, 163, 183, 168; 380/281, 380/282, 283, 278, 277
See application file for complete search history.

(56) References Cited

U.S. PATENT DOCUMENTS

| | | | | |
|---|---|---|---|---|
| 4,935,961 A | * | 6/1990 | Gargiulo et al. ............. 380/260 |
| 5,003,596 A | * | 3/1991 | Wood ........................... 380/28 |
| 5,412,723 A | * | 5/1995 | Canetti et al. ............... 713/155 |
| 5,495,533 A | * | 2/1996 | Linehan et al. ............. 713/155 |
| 5,517,567 A | * | 5/1996 | Epstein ........................ 380/247 |
| 5,623,546 A | * | 4/1997 | Hardy et al. ................. 713/193 |
| 5,701,468 A | * | 12/1997 | Benayoun et al. .......... 707/101 |
| 5,729,608 A | * | 3/1998 | Janson et al. ................ 713/171 |
| 5,832,087 A | * | 11/1998 | Hawthorne ................... 380/283 |
| 5,864,667 A | * | 1/1999 | Barkan ........................ 713/201 |
| 5,982,891 A | * | 11/1999 | Ginter et al. ................. 705/54 |
| 5,987,128 A | * | 11/1999 | Baba ........................... 380/279 |
| 6,031,912 A | * | 2/2000 | Moulart et al. ............... 380/44 |
| 6,038,322 A | * | 3/2000 | Harkins ....................... 380/279 |
| 6,055,636 A | * | 4/2000 | Hillier et al. ................ 713/200 |
| 6,084,968 A | * | 7/2000 | Kennedy et al. ............ 380/259 |
| 6,105,133 A | * | 8/2000 | Fielder et al. ............... 713/169 |
| 6,122,379 A | * | 9/2000 | Barbir ......................... 380/269 |
| 6,131,090 A | * | 10/2000 | Basso et al. .................. 706/23 |
| 6,182,214 B1 | * | 1/2001 | Hardjono ..................... 713/163 |

(Continued)

*Primary Examiner*—Ayaz Sheikh
*Assistant Examiner*—Christian LaForgia
(74) *Attorney, Agent, or Firm*—William H. Steinberg; Dillon & Yudell LLP

(57) ABSTRACT

The invention discloses a method of updating, in nodes on both ends of a secure link, the encryption key they share to encrypt and decrypt data. When having to transmit data from one of the nodes towards its peer remote node, a data base in the forwarding node, is first updated from the data to be transmitted. Then, encryption is performed and data transmitted to the peer remote node while a next-to-use encryption key is derived from the new contents of the data base. When received, data are decrypted with the current value of the encryption key and the peer remote node data base is updated identically from the received decrypted data after which a next-to-use encryption key is derived, thereby obtaining in the peer remote node, a next-to-use identical key. The data base is preferably the dictionary of a data compression/decompression system used simultaneously with encryption/decryption to transmit data over the secure link. While keys are frequently updated, for improved security, the invention does not require that key updates need to be actually distributed.

24 Claims, 4 Drawing Sheets

U.S. PATENT DOCUMENTS

| | | | |
|---|---|---|---|
| 6,185,685 B1 * | 2/2001 | Morgan et al. | 713/183 |
| 6,215,878 B1 * | 4/2001 | Harkins | 380/281 |
| 6,263,435 B1 * | 7/2001 | Dondeti et al. | 713/163 |
| 6,327,595 B1 * | 12/2001 | Lyson et al. | 707/201 |
| 6,330,671 B1 * | 12/2001 | Aziz | 713/163 |
| 6,336,121 B1 * | 1/2002 | Lyson et al. | 707/201 |
| 6,347,383 B1 * | 2/2002 | Elnozahy | 714/53 |
| 6,363,154 B1 * | 3/2002 | Peyravian et al. | 380/283 |
| 6,367,010 B1 * | 4/2002 | Venkatram et al. | 713/171 |
| 6,442,688 B1 * | 8/2002 | Moses et al. | 713/158 |
| 6,483,921 B1 * | 11/2002 | Harkins | 380/286 |
| 6,493,449 B2 * | 12/2002 | Anshel et al. | 380/30 |
| 6,711,709 B1 * | 3/2004 | York | 714/748 |

* cited by examiner

METHOD OF UPDATING ENCRYPTION KEYS IN A DATA COMMUNICATION SYSTEM

BACKGROUND OF THE INVENTION

1. Technical Field

The present invention relates generally to secure communications when data must be sent from a transmit device to a receive device in an encrypted form and particularly refers to a method of dynamically updating encryption keys without having to transmit them.

2. Description of the Related Art

Secure communications systems, based on cryptography, are used to prevent unauthorized access to data on communications links so that sensitive information can be exchanged with little risk of eavesdropping. In typical point-to-point cryptographic systems, an encryption device transmits encrypted or coded digital data to a decryption device over a secure data link.

The digital data is encoded using a key known only to the encryption and decryption parties in order to deny data access by any unauthorized third party. This scheme implicitly refers to symmetric encryption, the conventional method of insuring security in the exchange of information being characterized in that the same key is used both for encryption and decryption. The security of symmetric encryption remains in the key i.e., divulging the key means that anyone could encrypt and decrypt messages. That is why the algorithms used for symmetric encryption are also referred to as secret-key algorithms. The best example of this is DES, which stands for Data Encryption Standard, and which has been indeed a standard since the 70's and is still universally used. Again, the security of such an algorithm resides only in the key and does not depend, whatsoever, on the secrecy of the algorithm. On the contrary, as a standard, the algorithm is completely specified and made available to all users.

DES is a block cipher algorithm wherein data are encrypted and decrypted in 64-bit blocks. A 64-bit block of text is converted by the algorithm into a 64-bit block of cipher text, with no overhead, except the necessary padding to make the whole message encode a multiple of 64 bits. The basic key is 56-bit long although it is expressed as a 64-bit number since a parity bit, per byte, is used for parity checking however, ignored by the algorithm. Thus, the key can be any 56-bit number and can possibly be changed any time provided both parties have a secure means to agree on a new key before exchanging data. To improve the strength of DES i.e., to increase the difficulty of breaking it, triple pass DES with 112-bit key or 168-bit key is also commonly used today. Because DES has been around for over 20 years, it has been thoroughly tested and has behaved remarkably well against years of cryptanalysis. Although it is still secure, it becomes obviously relatively weaker due to the dramatic increase in power computation now available in a single computer and even more in a group of computers cooperating to break such a code. Therefore, breaking DES consists 'only' in retrieving the particular key that was used to encode a message or a file since algorithm itself is completely known as stated above. The trivial way of achieving this being a brute-force attack in which all $2^{56}$ keys of standard DES would be tried, insures that, on the average, after $2^{28}$ attempts, encryption key may be found.

Thus, besides the length of the key, which is the prime contributor to prevent DES to be easily cracked, the other very important contributor is the duration during which such a key stays in use between two parties that want to keep secret the content of the information they are exchanging. As a general rule no encryption key should be used for an indefinite period of time since the longer a key is used, the greater the risk it will be compromised (loss or accident e.g., a key could be accidentally displayed in clear due an application software bug) and the greater the temptation for someone to spend the effort necessary to break it. Breaking a key shared by two banks for an extended period of time e.g. one month, would enable a hacker to interfere in the exchange of money between those two banks during the same period of time. Also, the more data are secured with a given key, the more devastating the loss if the key is compromised. Finally, a long lifetime of a key also provides more ammunition for an adversary to break it since the adversary potentially has access to significantly more data to work with. Thus, it is clear that it would be highly desirable that keys should remain in use for short or very short periods of time (and ideally only for one session) so that no attack could reasonably be conducted with a good chance of success before key is updated. However, this brings the usual problem, in symmetric cryptography, of having to distribute the keys shared by pairs of users over a large network.

To solve this problem, asymmetric encryption was devised. RSA algorithm (named after its creators, i.e., Rivest, Shamir and Adelman) and asymmetric algorithms in general solve the problem by using two keys: one private (secret) key and one public key. Public key of party A is made accessible to anybody who has to talk to A. Thus, when party B is ready to talk to A, it must use public key A to encode a message. Because the scheme is asymmetric, only A using its private (secret) key, will be able to decode the message. Therefore, the message can contain the secret key to be shared by two users utilizing the symmetric encryption method previously described i.e. DES. This method, which is a standard is, in practice, required because RSA and generally speaking all known public-key algorithms assume a lot of calculations involving exponentiation and/or discrete logarithms to be computed on very large numbers. A RSA secret-key is now commonly a 1024-bit binary word (rapid progresses have been reported in the recent years on the cracking of RSA-like keys forcing the use of very large keys so that 2048-bit and 4096-bit keys are considered in the implementation of the crypto-processors specialized to process RSA and DES algorithms for fast encryption) assuming that exponential calculations in that range are performed to encrypt a message. Thus, RSA algorithm is reported to be several orders of magnitude slower than DES, which explain why both are most often combined to implement a cryptographic system.

Before the encryption, the compression of data is very often used in data communications systems. The objective is twofold. Besides limiting the memory required to store a compressed file, the chief advantage is that less data have to be transmitted overall, thus saving bandwidth on expensive communications lines. Also, data compression can make cryptanalysis more difficult. Most often, to launch an attack, especially a brute-force attack, a cryptanalyst needs a small amount of cipher data and the corresponding plain data. In practice, this may not be difficult to obtain since communications protocols, at various levels, have standard message headers whose formats are well known.

Since data compression is performed on top of encryption, the corresponding plain data are meaningless or at least it becomes very difficult to match a particular protocol header. Especially, the numerous data compression techniques derived from the Ziv-Lempel method (J. Ziv and A.

Lempel, 'Compression of Individual Sequences via Variable-Rate Coding,' IEEE Trans. Inform. Theory, vol. IT-24, no. 5, 1978) assume the use of an evolving dictionary in each node where data are compressed and decompressed. Then, dictionary contains the codeword representation based on a tree structure with brother, son and parent links and the corresponding character on each node or leaf. It is possible to start with an empty dictionary which needs to contain however, the first character of each sub-tree.

Although the dictionary is constantly evolving, it is kept identical on both ends while no specific data exchange need to take place to maintain the same contents. This is achieved from the transmitted data itself. With such a scheme, an identical evolving database is thus available on either end of a communication link while the changes cannot deduced, from the observation by an eavesdropper, of the data exchanged over the line. Therefore, a dynamic key can be derived from the directory contents using some form of one-way function such as hashing in order to frequently generate new keys.

Therefore, even if data compression before encryption can improve the security inasmuch as the compression increases the difficulty of cracking the encryption key, a perfect security can be obtained only by frequently changing the encryption key. Although RSA key can be used to exchange new secret keys, such an exchange involve resources, adds overhead and stops the normal data transmission since the security association should be restarted. This is why secret keys are not changed very often and would never be changed at each packet. But keeping the same key during some time opens ways to spy, modify, reroute or copy the data using copy and paste to another stream and is not safe whatever the complexity of the encryption is.

SUMMARY OF THE INVENTION

Therefore, the main object of the invention is to improve the security of a symmetric cryptographic system by allowing to change frequently the common secret key.

It is a further object of the invention to provide a method of dynamically updating the common encryption/decryption key of a symmetric encryption system on both ends of a secure communication link without having to actually exchange a new key, thus avoiding the frequent use of a public-key asymmetric encryption system or any equivalent system of distributing keys.

It is another object of the invention to derive the next secret key to use from an evolving database, the contents of which are kept identical on both ends of a communication link, such as the dictionary of a data compressing system.

The invention relates therefore to a method of updating in a data communications system, the encryption key shared by nodes on both ends of a communication link. The nodes include an identically evolving data base. When having to transmit data from one of the nodes towards its peer remote node, the data base is first updated from the data to be transmitted. Then, from the current value of a key, encryption is performed over the data that are thus transmitted to the peer remote node. After which, a next-to-use encryption key is derived from the new contents of the data base. When the encrypted data are received by the peer remote node, they are first decrypted with the current value of the encryption key. Then, the data base of peer remote node is updated identically from the received decrypted data. From the contents of the data base, a next-to-use encryption key is derived, thereby obtaining in the peer remote node a next-to-use identical key.

In a preferred embodiment of the invention data base is the dictionary of a data compression/decompression system used simultaneously with encryption/decryption to transmit data. The method of the invention permits that the key of a symmetric encryption system be frequently updated on both ends of a secure communication link thus, greatly improving security, without requiring that new keys need to be actually transmitted.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
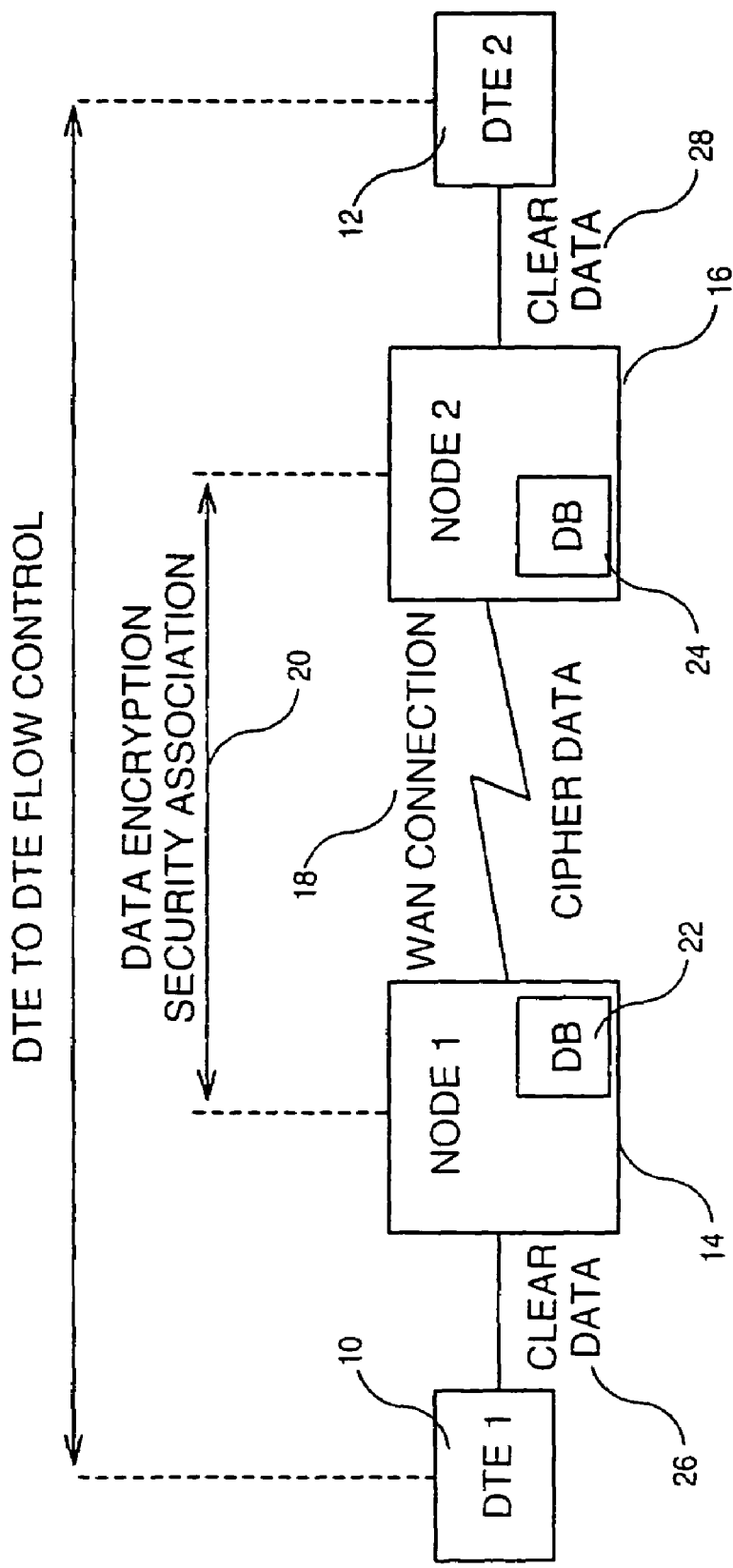
FIG. 1 is a schematic block-diagram showing the minimum network configuration necessary to implement the method according to the invention.

FIG. 1 describes the minimum network configuration necessary to better understand the framework of the invention. In this network two DTEs (data terminal equipment) devices DTE1 10 and DTE2 12 communicating respectively through nodes NODE 1 14 and NODE 2 16 have to establish a secure communication over e.g. a WAN (Wide Area Network) connection 18 thus, forming a security association 20 referred to as SA in the following. Therefore, nodes 14 and 16 have the capability of encrypting and decrypting their communications using a common secret key. The key is kept constantly updated, with the mechanism of the invention as further described in the following figures, so as to greatly improve the security of the transactions over the WAN connection 18.

This mechanism is based on the assumption that an evolving data base 22 or 24 is present in each node the contents of which are kept identical. On the contrary, communications between DTE1 and NODE 1 14 on one hand and between DTE2 and NODE 2 16 on the other hand are in clear since they are assumed to be performed in a secure confined environment, e.g. within a single box located in the user's premises. The method of the invention assumes that a first common key is available in NODE 1 14 and NODE 2 16 to start playing with. The way this is achieved (once at initialization and possibly at regular intervals or on the occurrence of an event later on) is beyond the scope of the invention and could be performed, e.g. through the use a public-key algorithm, such as RSA, well known from the art and briefly described here above in the background art section, or through any other method of distributing a secret key. It is worth noting that forming such an SA or restoring it after a while (because SAs are generally configured so as they time out, for the sake of security, irrespective of the traffic, but are only restored on demand) is disruptive for the ongoing traffic, or needs time to be re-established, while the method of the invention which allows to frequently update keys does not hold traffic whatsoever.

Figure 2:
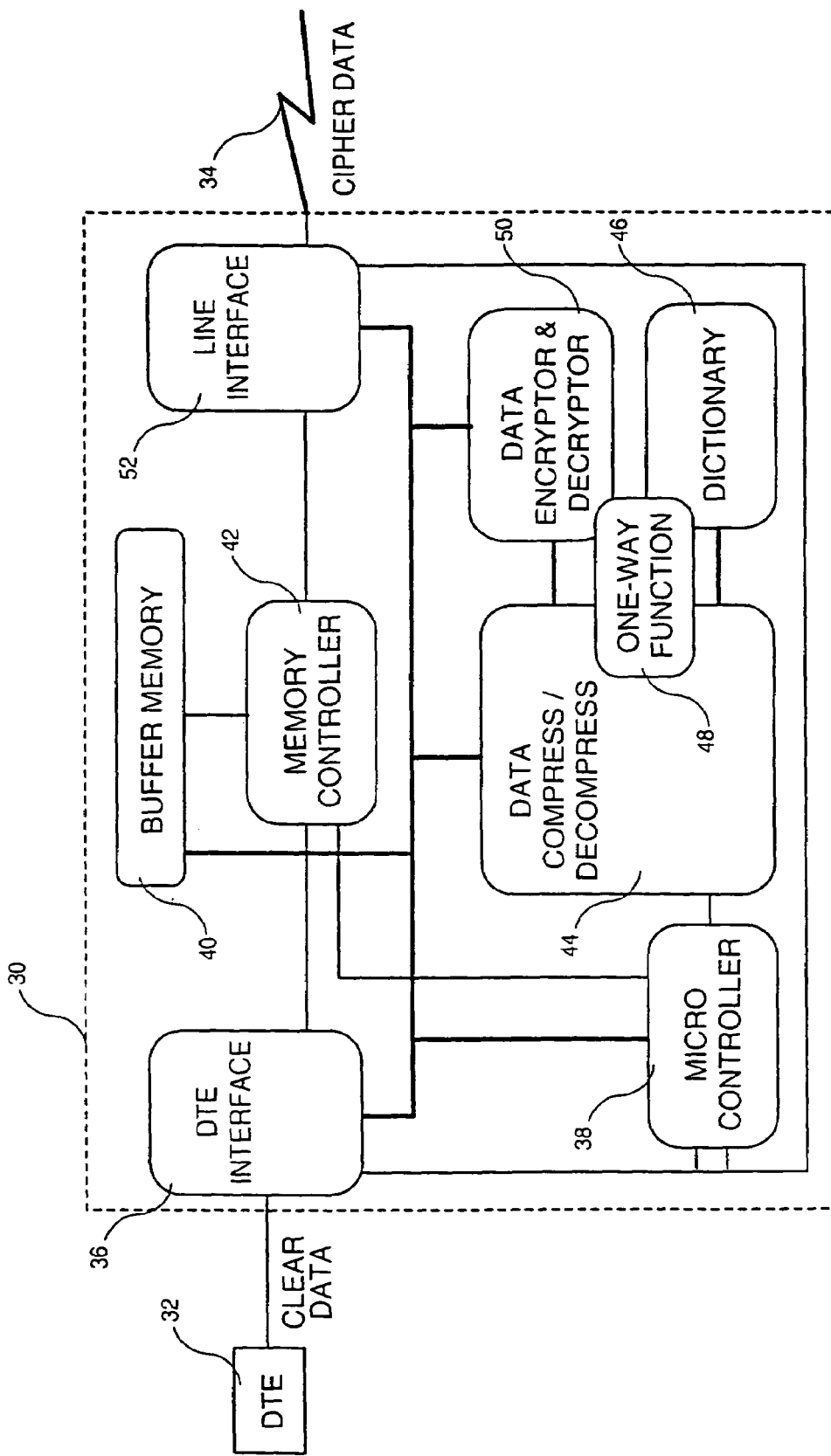
FIG. 2 is a block diagram of a node comprising all the features used to implement the method according to the invention.

FIG. 2 better describes a node 30, of the kind shown in FIG. 1, interfacing a DTE 32 on one end and a transmission line 34 on the other end. The Node includes a 'DTE Interface and Flow Control circuitry' 36 whose function, in cooperation with 'MicroController' 38, is to achieve the temporary storing, into a 'Buffer Memory' 40, of the data stream or packets received from DTE 32 so that they are eventually transmitted to a remote node. As an example, this is performed here with the help of a 'Memory and DMA (Direct Memory Access) Controller' 42. Then, data packets are sent to a 'Data Compressor/Decompressor' 44 which uses and updates a Dictionary 46. On each data packet or set of packets, forming an entity to be transmitted over the transmission line 34, a one-way function 48 such as hashing or CRC (Cyclic Redundancy Checking) is performed on Dictionary 46 so as to compute a fixed-size digest or signature of it reflecting its current contents. This is typically a 100-bit to 200-bit vector which is passed to 'Data Encryptor and Decryptor' 50 from which the next key to be used is generated and used over the compressed data also sent to 'Data Encryptor and Decryptor' 50. Then, encrypted packets are sent to a remote node through a Line Interface and Flow Control circuitry 52 for low layer encapsulation and transmission over line 34.

Receiving is similar to what is just described above but in reverse order. Encrypted data received from the line 34 are stored alike in 'Buffer Memory' 40 after having been decrypted using the current key available in 'Data Encryptor and Decryptor' 50. Once decrypted, compressed data is sent to 'Data Compressor/Decompressor' 44 and Dictionary 46 is updated, allowing to generate a new key value derived from the new contents of the dictionary with the same one-way function 48 mentioned above. This new value is passed to 'Data Encryptor and Decryptor' 50 in order to be used for a next data packet or set of data packets. The decompressed data is stored temporarily in Buffer Memory 40 before being sent, in clear, to DTE 32 through 'DTE Interface and Flow Control' circuitry 36.

Figure 3:
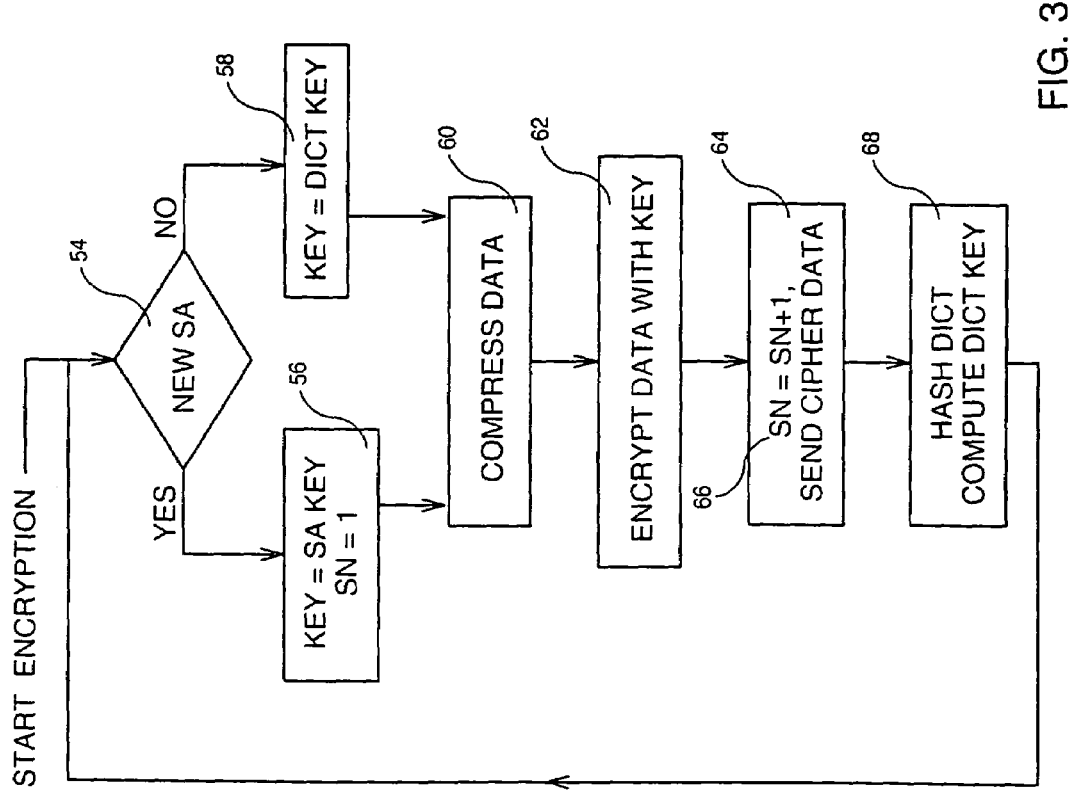
FIG. 3 is a flow chart showing the different steps to the method according to the invention when transmitting to a remote node.

FIG. 3 describes the encryption process which starts when a new key has been made available in both nodes i.e., in nodes 14 and 16 shown previously in FIG. 1, which are then able to establish a secure communication between them forming a new security association or SA already discussed in FIG. 1. Step 54 checks whether a new SA has just been defined. This is the case whenever a secure communication is initialized, but also each time a new encryption key is exchanged later on, through another channel, or with a different mechanism, e.g. by enabling a key exchange through a secure session using a public-key encryption system, a technique well-known from the art. According to the invention, a new security association can also be formed periodically or upon the occurrence of a particular event such as overflowing of the packet sequence number or detecting transmission of errors.

If this is indeed the case, one proceeds to step 56 where the current encryption key, simply referred to as KEY in the following, becomes the new SA key. Also, the sequence number 'SN' used in the encryption protocol header is reset to 1. However, if answer to interrogation 54 is negative (the usual case) KEY is updated at step 58 from a value derived from the encryption dictionary 46 shown in FIG. 2. As already discussed, this value used to update the current key is, generally speaking, a fixed-size digest, e.g. the result of a hash function or a CRC, applied on the contents of the dictionary which are constantly evolving depending upon the data exchanged between the two nodes.

Once a KEY is defined, step 60 is performed during which data is compressed. The latter step may be made as sophisticated or as simple as necessary depending on which criterion must be first considered. For example, a simple compression algorithm could be retained if computing resources are scarce in nodes. However, if computing resources are not the limiting factor, one may decide to get a better compression ratio using a more complex method such as the one defined in standard V.42bis of ITU-T (International Telecommunications Union) based on the Ziv-Lempel algorithm previously discussed. However, whichever solution is adopted for compression, the main objective remains that codewords are used in transmission instead of real data, codewords based on an evolving dictionary are actually exchanged.

When compression is done, compressed data is encrypted at step 62 using current KEY. After which, at step 64 an encrypted packet is formatted whose header 'Sequence Number' SN 66 is incremented by one so as the enciphered data can be sent over the line to the peer remote node. It is worth noting here that SN field is always a fixed-size field (typically a 16-bit wide field) so as SN counter eventually wraps. Therefore, it is a good practice that wrapping of the counter associated to this field triggers a new SA so that key updating process resumes with a fresh seed key further contributing to keep nodes transactions secure.

Finally, step 68 performs a hash on the new dictionary contents (or whichever function is selected to get a fixed-size digest of it) in order to build a new key that is used at next loop when process resumes at step 54.

Figure 4:
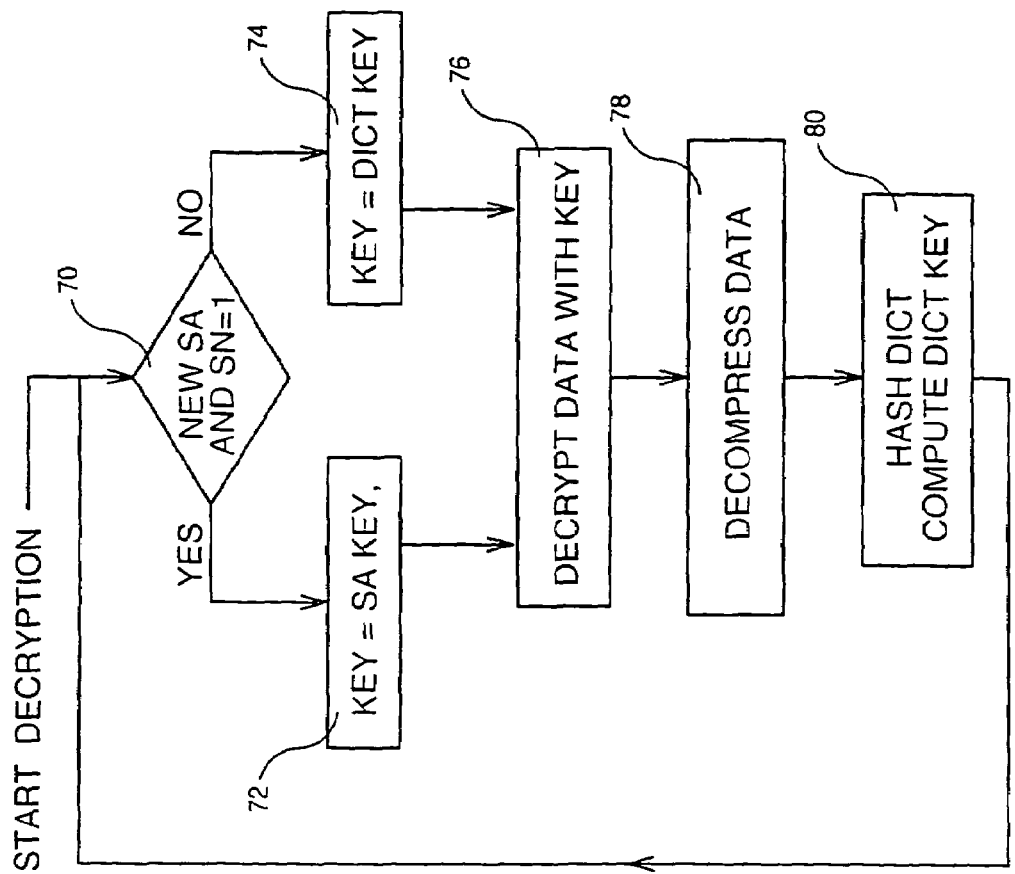
FIG. 4 is a flow chart showing the different steps of the method according to the invention when receiving from a remote node.

FIG. 4 describes the decryption process which starts with the receiving of a new packet from a peer node. This may take place only after a SA (security association) has been set between the two nodes and implies that a first common key is available in them to start with. Steps 70, 72 and 74 are just identical to what is described for the encryption process in FIG. 3 here above. Briefly, KEY to use, as with encryption, is either a new key resulting of a new SA or an updated one resulting of a computation over current contents of dictionary.

Once KEY is selected, next step 76 is to decrypt the incoming data from it. Then, at step 78 data is de-compressed. While starting from the current contents of the dictionary, the decompression step itself has the effect of updating it, based on the new received data from the peer node (so as dictionary is constantly evolving). Finally, as with encryption, a new hash on the dictionary contents must return, step 80, a value identical to the one obtained with the encryption process, in the remote node, and from which the same new key is derived after which receive process resumes at step 70.

Obviously, all of this implicitly assumes that no error occurs in the transmission so as the evolution of the dictionaries is kept identical on both ends of the secure link. However, as soon as an error is detected, all standard methods known from the art may possibly be applied to recover so as communication can resume in a known state. This includes the simple solution of restarting from scratch with a new key while dictionaries are reset. As far as this latter point is concerned the invention does not assume that, at initialization or after a recovery on error, dictionaries need to be 'blanked' or may just contain a skeleton from which they are progressively rebuilt through the data compression process. Dictionaries may be filled with predefined values however, at the expense of having to consider this as a secret to be protected like keys.

What is claimed is:

1. A method of updating a secret encryption key in a data communication system, said method comprising:
   a transmitting node receiving clear data;
   updating a sending database, in said transmitting node, utilizing said clear data;
   in said transmitting node, encrypting said clear data using a current secret encryption key;
   transmitting said encrypted data to a receiving node; and
   deriving from said current value of said secret encryption key and said updated database in said transmitting node, a next secret encryption key to be used to encrypt a next data transmission.

2. The method of claim 1, further comprising:
   upon receiving encrypted data in said receiving node, decrypting said encrypted data to obtain decrypted data by using a current value of a secret decryption key;
   updating a receiving database in said receiving node with said decrypted data to synchronize said receiving database to said sending database; and
   deriving, from contents of said receiving database in said receiving node, a next secret decryption key identical to said next secret decryption key.

3. The method according to claim 2, further comprising:
   compressing said clear data, and;
   decompressing said decrypted data.

4. The method of claim 2, wherein said step of updating said sending database and said step of updating said receiving database further comprise creating identically evolving versions of a dictionary for respectively compressing data before encrypting and decompressing data after decrypting.

5. The method of claim 1, further comprising creating said sending database from an initial secret encryption key.

6. The method of claim 1, wherein said deriving step further comprises generating a digest of said sending database by one of the set of hashing to a fixed-size value and computing a cyclic redundancy checking value.

7. The method of claim 1, further comprising forming a new security association in response to one of the set of the passage of a time interval, overflowing of the packet sequence number and detecting transmission errors.

8. A method of updating a secret encryption key in a data communication system, said method comprising:
   upon receiving encrypted data in a receiving node, decrypting said encrypted data to obtain decrypted data by using a secret decryption key;
   updating a receiving database in said receiving node with said decrypted data to synchronize said receiving database to a sending database; and
   deriving, from contents of said receiving database in said receiving node, a next secret decryption key to be used to decode a next data transmission.

9. A computer program product in a computer-readable medium, for updating a secret encryption key in a data communication system, said computer program product comprising:
   a computer readable medium;
   instructions on the computer-readable medium for allowing a transmitting node to receive clear data;
   instructions on the computer-readable medium for, upon receiving said clear data, updating a sending database, in said transmitting node, utilizing said clear data;
   instructions on the computer-readable medium for, in said transmitting node, encrypting said clear data using a current secret encryption key;
   instructions on the computer-readable medium for deriving from said current value of said encryption key and said update database in said transmitting node, a next secret encryption key to be used to encrypt a next data transmission.

10. The computer program product of claim 9 further comprising:
    instructions on the computer-readable medium for, upon receiving encrypted data in said receiving node, decrypting said encrypted data to obtain decrypted data by using a current value of a secret decryption key;
    instructions on the computer-readable medium for updating a receiving database in said receiving node with said decrypted data to synchronize said receiving database to said sending database; and
    instructions on the computer-readable medium for deriving, from contents of said receiving database in said receiving node, a next secret decryption key identical to said next encryption key.

11. The computer program product of claim 10, further comprising:
    instructions on the computer-readable medium for compressing said clear data; and
    instructions on the computer-readable medium for decompressing said decrypted data.

12. The computer program product of claim 10, wherein said instructions on the computer-readable medium for updating said database and said instructions of updating said receiving database further comprise instructions on the computer-readable medium for creating identically evolving versions of a dictionary for respectively compressing data before encrypting and decompressing data after decrypting.

13. The computer program product of claim 9, further comprising instructions on the computer-readable medium for creating said sending database from an initial secret encryption key.

14. The computer program product of claim 9, wherein said deriving instructions further comprise instructions on the computer-readable medium for generating a digest of said sending database by one of the set of hashing to a fixed-size value and computing a cyclic redundancy checking value.

15. The computer program product of claim 9, further comprising instructions on the computer-readable medium for forming a new security association in response to one of the set of elapsing of a time interval, overflowing of the packet sequence number and detecting transmission errors.

16. A computer program product in a computer-readable medium for updating s secret encryption key in a data communication system, said computer program product comprising:
    a computer-readable medium;
    instructions on the computer-readable medium for, upon receiving encrypted data in a receiving node, decrypting said encrypted data to obtain decrypted data by using a secret decryption key;
    instructions on the computer-readable medium for deriving, from contents of said receiving database in said receiving node, a next secret decryption key to be used to decode a next data transmission.

17. A system for updating a secret encryption key in data communication system, said system comprising:
- means for enabling a transmitting node to receive clear data;
- means for, upon receiving said clear data, updating a sending database, in said transmitting node, said clear data;
- means for, in said transmitting node, encrypting said clear data using a current secret encryption key;
- means for deriving from said current value of said encryption key and said updated database in said transmitting node, a next secret encryption key to be used to encrypt a next data transmission.

18. The system of claim 17, further comprising:
- means for, upon receiving encrypted data in said receiving node, decrypting said encrypted data to obtain decrypted data by using a current value of a secret decryption key;
- means for updating a receiving database in said receiving node with said decrypted data to synchronize said receiving database to said sending database; and
- means for deriving, from contents of said receiving database in said receiving node, a next decryption key identical to said next decryption key.

19. The system of claim 18, further comprising:
means for compressing said clear data; and
means for decompressing said decrypted data.

20. The system of claim 18, wherein said means for updating said sending database and said means for updating said receiving database further comprise means for creating identically evolving versions of a dictionary for respectively compressing data before encrypting and decompressing data after decrypting.

21. The system of claim 17, further comprising means for creating said sending database from an initial secret encryption key.

22. The system of claim 17, wherein said deriving means further comprise means for generating a digest of said sending database by one of the set of hashing to a fixed-size value and computing a cyclic redundancy checking value.

23. The system of claim 17, further comprising means for forming a new security association in response to one of the set of elapsing of a time interval, overflowing of the packet sequence number and detecting transmission errors.

24. A system for updating a secret encryption key in a data communication system, said system comprising:
- means for, upon receiving encrypted data in a receiving node, decrypting said encrypted data to obtain decrypted data by using a secret decryption key;
- means for updating a receiving database in said receiving node with said decrypted data to synchronize said receiving database to a sending database; and
- means for deriving, from contents of said receiving database in said receiving node, a next secret encryption key to be used to decode a next data transmission.

* * * * *